(12) United States Patent
Saxena et al.

(10) Patent No.: US 11,522,942 B2
(45) Date of Patent: Dec. 6, 2022

(54) SYSTEM AND METHOD FOR PARSING APPLICATION NETWORK ACTIVITY

(71) Applicant: Pearson Education, Inc., Bloomington, MN (US)

(72) Inventors: Ritu Saxena, Parker, CO (US); Jeffrey DeYoung, Parker, CO (US)

(73) Assignee: PEARSON EDUCATION, INC., Bloomington, MN (US)

( * ) Notice: Subject to any disclaimer, the term of this patent is extended or adjusted under 35 U.S.C. 154(b) by 0 days.

(21) Appl. No.: 17/017,394

(22) Filed: Sep. 10, 2020

(65) Prior Publication Data

US 2022/0078224 A1 Mar. 10, 2022

(51) Int. Cl.
*G06N 20/00* (2019.01)
*H04L 41/0273* (2022.01)
*H04L 67/02* (2022.01)

(52) U.S. Cl.
CPC ............. *H04L 67/02* (2013.01); *G06N 20/00* (2019.01); *H04L 41/0293* (2013.01)

(58) Field of Classification Search
CPC ................. H04L 67/02; H04L 29/0809; H04L 41/0293; G06N 20/00
See application file for complete search history.

(56) References Cited

U.S. PATENT DOCUMENTS

| 8,082,322 | B1* | 12/2011 | Pascarella | ............... G06F 9/541 709/219 |
| 2010/0318370 | A1* | 12/2010 | Bhattacharyya | .... H04L 41/0293 705/1.1 |
| 2017/0344605 | A1* | 11/2017 | Wells | ................... G06F 16/2453 |
| 2017/0344887 | A1* | 11/2017 | Ahmed | ................... G06N 20/00 |

\* cited by examiner

*Primary Examiner* — Soe Hlaing
(74) *Attorney, Agent, or Firm* — Quarles & Brady LLP

(57) ABSTRACT

A system and method are configured for receiving a data transmission encoding a content of a hypertext transfer protocol request and an identification of a first service, determining a first schema definition in a memory that is associated with the first service, the first schema definition including a plurality of schema items, and parsing the content of the hypertext transfer protocol request to identify a plurality of parameters and a plurality of values, each value in the plurality of values being associated with a parameter in the plurality of parameters. The system and method are configured for, for each schema item in the plurality of schema items, identifying a parameter in the content of the hypertext transfer protocol request that matches the schema item, and encoding the value associated with the parameter into a schema information object. The method includes storing the schema information object in the memory.

19 Claims, 7 Drawing Sheets

SYSTEM AND METHOD FOR PARSING APPLICATION NETWORK ACTIVITY

FIELD OF THE INVENTION

This disclosure relates to the field of systems and methods configured for data analysis and, more specifically, processing network traffic data to generate metrics relating to the use of software applications.

SUMMARY OF THE INVENTION

The present invention provides systems and methods comprising one or more server hardware computing devices or client hardware computing devices, communicatively coupled to a network, and each comprising at least one processor executing specific computer-executable instructions within a memory that, when executed, cause the system to:

In an embodiment, a system includes a memory storing a plurality of schema definitions. Each schema definition is associated with at least one service. The system includes a network interface and a processor. The processing is configured to perform the steps of receiving a data transmission using the network interface, the data transmission encoding a content of a hypertext transfer protocol request and an identification of a first service, determining, using the identification of the first service, a first schema definition in the memory that is associated with the first service, the first schema definition including a plurality of schema items, and parsing the content of the hypertext transfer protocol request to identify a plurality of parameters and a plurality of values, each value in the plurality of values being associated with a parameter in the plurality of parameters. The processing is configured to perform the steps of, for each schema item in the plurality of schema items, identifying a parameter in the content of the hypertext transfer protocol request that matches the schema item, and encoding the value associated with the parameter into a schema information object. The processing is configured to perform the steps of storing the schema information object in the memory.

In another embodiment, a method includes receiving a data transmission using a network interface, the data transmission encoding a content of a hypertext transfer protocol request and an identification of a first service, determining, using the identification of the first service, a first schema definition in a memory that is associated with the first service, the first schema definition including a plurality of schema items, and parsing the content of the hypertext transfer protocol request to identify a plurality of parameters and a plurality of values, each value in the plurality of values being associated with a parameter in the plurality of parameters. The method includes, for each schema item in the plurality of schema items, identifying a parameter in the content of the hypertext transfer protocol request that matches the schema item, and encoding the value associated with the parameter into a schema information object. The method includes storing the schema information object in the memory.

The above features and advantages of the present invention will be better understood from the following detailed description taken in conjunction with the accompanying drawings.

DETAILED DESCRIPTION

Figure 1:
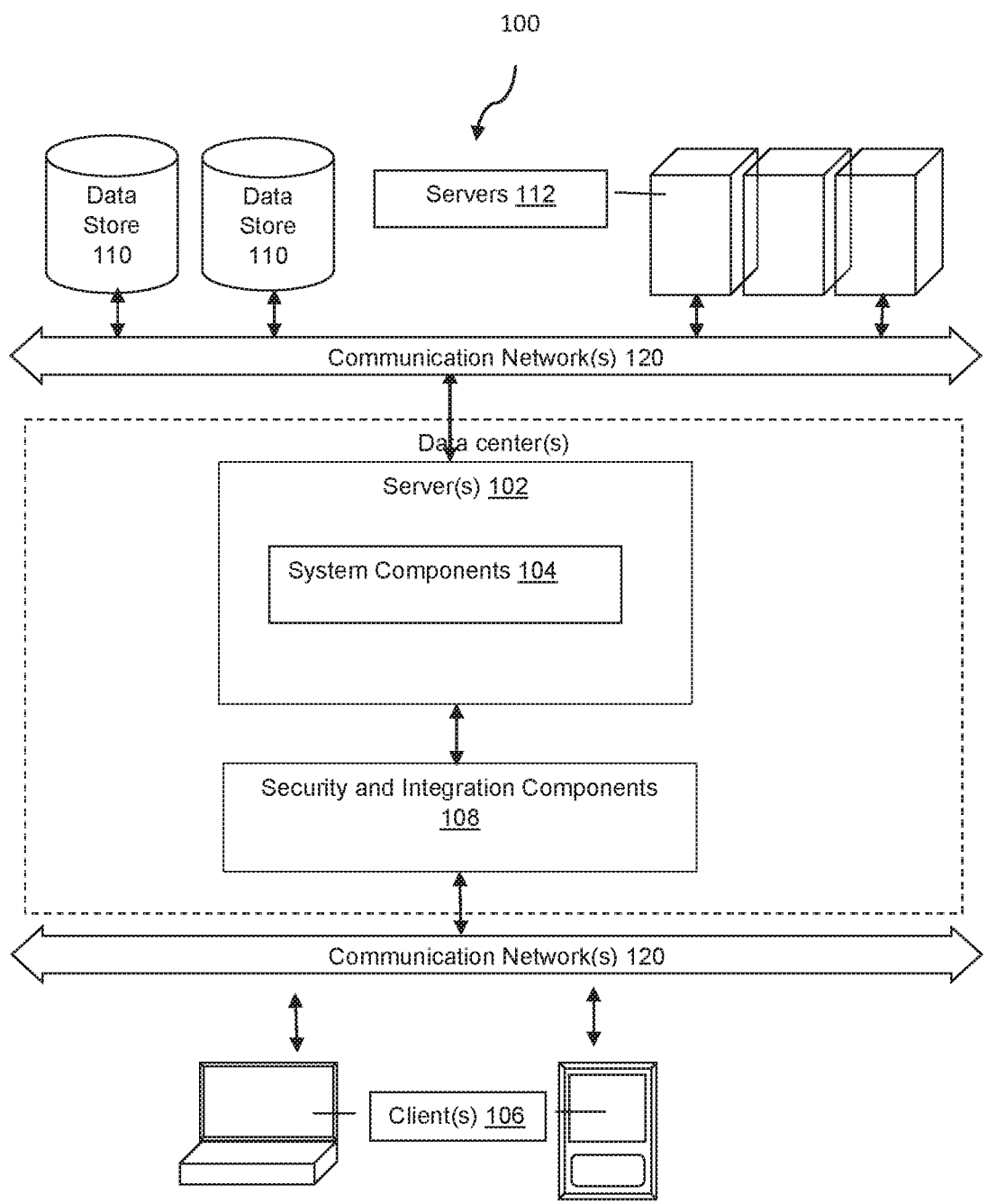
FIG. 1 illustrates a system level block diagram for an example distributed computing environment.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Network

FIG. 1 illustrates a non-limiting example distributed computing environment 100, which includes one or more computer server computing devices 102, one or more client computing devices 106, and other components that may implement certain embodiments and features described herein. Other devices, such as specialized sensor devices, etc., may interact with client 106 and/or server 102. The server 102, client 106, or any other devices may be configured to implement a client-server model or any other distributed computing architecture.

Server 102, client 106, and any other disclosed devices may be communicatively coupled via one or more communication networks 120. Communication network 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone networks (PSTNs), a virtual network, etc. Network 120 may use any available protocols, such as (e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

Servers/Clients

Figure 2:
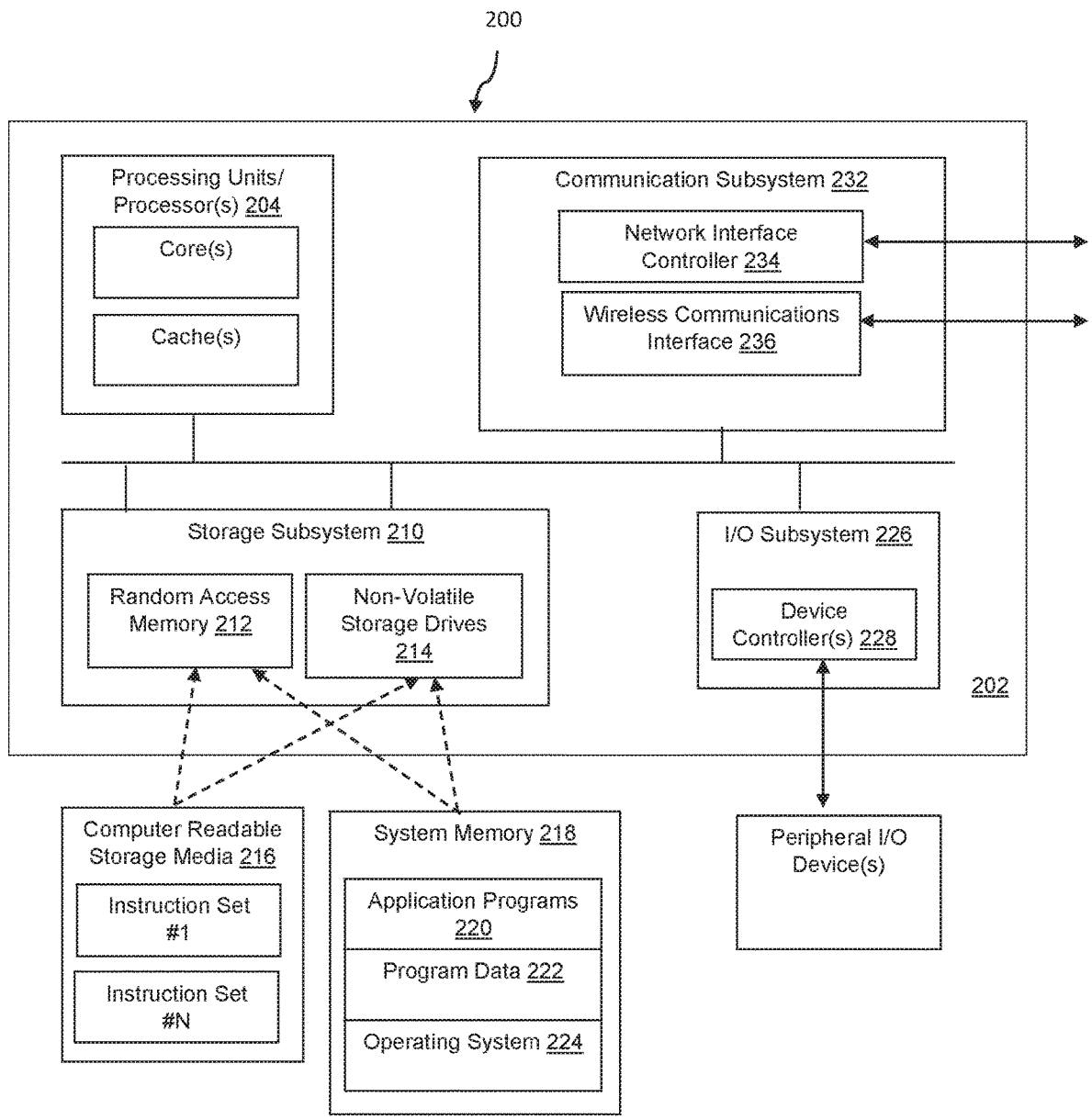
FIG. 2 illustrates a block diagram of an illustrative computer system.

The embodiments shown in FIGS. 1-2 are thus one example of a distributed computing system and is not intended to be limiting. The subsystems and components within the server 102 and client devices 106 may be implemented in hardware, firmware, software, or combinations thereof. Various different subsystems and/or components 104 may be implemented on server 102. Users operating the client devices 106 may initiate one or more client applications to use services provided by these subsystems and components. Various different system configurations are possible in different distributed computing systems 100 and content distribution networks. Server 102 may be configured to run one or more server software applications or services, for example, web-based or cloud-based services, to support content distribution and interaction with client devices 106. Users operating client devices 106 may in turn utilize one or more client applications (e.g., virtual client applications) to interact with server 102 to utilize the services provided by these components. Client devices 106 may be configured to receive and execute client applications over one or more networks 120. Such client applications may be web browser based applications and/or standalone software applications, such as mobile device applications. Client devices 106 may receive client applications from server 102 or from other application providers (e.g., public or private application stores).

Security

As shown in FIG. 1, various security and integration components 108 may be used to manage communications over network 120 (e.g., a file-based integration scheme or a service-based integration scheme). Security and integration components 108 may implement various security features for data transmission and storage, such as authenticating users or restricting access to unknown or unauthorized users, As non-limiting examples, these security components 108 may comprise dedicated hardware, specialized networking components, and/or software (e.g., web servers, authentication servers, firewalls, routers, gateways, load balancers, etc.) within one or more data centers in one or more physical location and/or operated by one or more entities, and/or may be operated within a cloud infrastructure.

In various implementations, security and integration components 108 may transmit data between the various devices in the content distribution network 100. Security and integration components 108 also may use secure data transmission protocols and/or encryption (e.g., File Transfer Protocol (FTP), Secure File Transfer Protocol (SFTP), and/or Pretty Good Privacy (PGP) encryption) for data transfers, etc.).

In some embodiments, the security and integration components 108 may implement one or more web services (e.g., cross-domain and/or cross-platform web services) within the content distribution network 100, and may be developed for enterprise use in accordance with various web service standards (e.g., the Web Service Interoperability (WS-I) guidelines). For example, some web services may provide secure connections, authentication, and/or confidentiality throughout the network using technologies such as SSL, TLS, HTTP, HTTPS, WS-Security standard (providing secure SOAP messages using XML encryption), etc. In other examples, the security and integration components 108 may include specialized hardware, network appliances, and the like (e.g., hardware-accelerated SSL and HTTPS), possibly installed and configured between servers 102 and other network components, for providing secure web services, thereby allowing any external devices to communicate directly with the specialized hardware, network appliances, etc.

Data Stores (Databases)

Computing environment 100 also may include one or more data stores 110, possibly including and/or residing on one or more back-end servers 112, operating in one or more data centers in one or more physical locations, and communicating with one or more other devices within one or more networks 120. In some cases, one or more data stores 110 may reside on a non-transitory storage medium within the server 102. In certain embodiments, data stores 110 and back-end servers 112 may reside in a storage-area network (SAN). Access to the data stores may be limited or denied based on the processes, user credentials, and/or devices attempting to interact with the data store.

Computer System

With reference now to FIG. 2, a block diagram of an illustrative computer system is shown. The system 200 may correspond to any of the computing devices or servers of the network 100, or any other computing devices described herein. In this example, computer system 200 includes processing units 204 that communicate with a number of peripheral subsystems via a bus subsystem 202. These peripheral subsystems include, for example, a storage subsystem 210, an I/O subsystem 226, and a communications subsystem 232.

Processors

One or more processing units 204 may be implemented as one or more integrated circuits (e.g., a conventional microprocessor or microcontroller), and controls the operation of computer system 200. These processors may include single core and/or multicore (e.g., quad core, hexa-core, octo-core, ten-core, etc.) processors and processor caches. These processors 204 may execute a variety of resident software processes embodied in program code, and may maintain multiple concurrently executing programs or processes. Processor(s) 204 may also include one or more specialized processors, (e.g., digital signal processors (DSPs), outboard, graphics application-specific, and/or other processors).

Buses

Bus subsystem 202 provides a mechanism for intended communication between the various components and subsystems of computer system 200. Although bus subsystem 202 is shown schematically as a single bus, alternative embodiments of the bus subsystem may utilize multiple buses. Bus subsystem 202 may include a memory bus, memory controller, peripheral bus, and/or local bus using any of a variety of bus architectures (e.g. Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

Input/Output

I/O subsystem 226 may include device controllers 228 for one or more user interface input devices and/or user interface output devices, possibly integrated with the computer system 200 (e.g., integrated audio/video systems, and/or touchscreen displays), or may be separate peripheral devices which are attachable/detachable from the computer system 200. Input may include keyboard or mouse input, audio input (e.g., spoken commands), motion sensing, gesture recognition (e.g., eye gestures), etc.

Input

As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like.

Output

In general, use of the term "output device" is intended to include all possible types of devices and mechanisms for outputting information from computer system 200 to a user or other computer. For example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or non-visual displays such as audio output devices, etc. As non-limiting examples, output devices may include, indicator lights, monitors, printers, speakers, headphones, automotive navigation systems, plotters, voice output devices, modems, etc.

Memory or Storage Media

Computer system 200 may comprise one or more storage subsystems 210, comprising hardware and software components used for storing data and program instructions, such as system memory 218 and computer-readable storage media 216.

System memory 218 and/or computer-readable storage media 216 may store program instructions that are loadable and executable on processor(s) 204. For example, system memory 218 may load and execute an operating system 224, program data 222, server applications, client applications 220, Internet browsers, mid-tier applications, etc.

System memory 218 may further store data generated during execution of these instructions. System memory 218 may be stored in volatile memory (e.g., random access memory (RAM) 212, including static random access memory (SRAM) or dynamic random access memory (DRAM)). RAM 212 may contain data and/or program modules that are immediately accessible to and/or operated and executed by processing units 204.

System memory 218 may also be stored in non-volatile storage drives 214 (e.g., read-only memory (ROM), flash memory, etc.) For example, a basic input/output system (BIOS), containing the basic routines that help to transfer information between elements within computer system 200 (e.g., during start-up) may typically be stored in the non-volatile storage drives 214.

Computer Readable Storage Media

Storage subsystem 210 also may include one or more tangible computer-readable storage media 216 for storing the basic programming and data constructs that provide the functionality of some embodiments. For example, storage subsystem 210 may include software, programs, code modules, instructions, etc., that may be executed by a processor 204, in order to provide the functionality described herein. Data generated from the executed software, programs, code, modules, or instructions may be stored within a data storage repository within storage subsystem 210.

Storage subsystem 210 may also include a computer-readable storage media reader connected to computer-readable storage media 216. Computer-readable storage media 216 may contain program code, or portions of program code. Together and, optionally, in combination with system memory 218, computer-readable storage media 216 may comprehensively represent remote, local, fixed, and/or removable storage devices plus storage media for temporarily and/or more permanently containing, storing, transmitting, and retrieving computer-readable information.

Computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 200.

By way of example, computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 216 may include, but is not limited to, Zip® drives, flash memory cards, universal serial bus (USB) flash drives, secure digital (SD) cards, DVD disks, digital video tape, and the like. Computer-readable storage media 216 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 200.

Communication Interface

Communications subsystem 232 may provide a communication interface from computer system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 236 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

Input Output Streams Etc.

In some embodiments, communications subsystem 232 may also receive input communication in the form of structured and/or unstructured data feeds, event streams, event updates, and the like, on behalf of one or more users who may use or access computer system 200. For example, communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 232 may output such structured and/or unstructured data feeds, event streams, event updates, and the like to one or more data stores that may be in communication with one or more streaming data source computers coupled to computer system 200.

Connect Components to System

The various physical components of the communications subsystem 232 may be detachable components coupled to the computer system 200 via a computer network, a FireWire® bus, or the like, and/or may be physically integrated onto a motherboard of the computer system 200. Communications subsystem 232 also may be implemented in whole or in part by software.

Other Variations

Due to the ever-changing nature of computers and networks, the description of computer system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Users can interact with applications running with computer systems (e.g., application programs 220 of computer system 200) in many different ways. Users can login to applications (e.g., authenticate), logout, provide user input (e.g. in the form of responding to posed questions) or request particular content or data, review content provided by the application, or take other actions. In typical computing environments, it may be beneficial to track some of these interactions in order to develop metrics (e.g., anonymous and non-personal) that describe the software usage generally. For example, numbers of people logging into software and average use times of particular features could be useful metrics that developers may wish to know for certain software applications. In other cases, user-specific metrics may be interesting for developers and other individuals (e.g., educators), such as whether the amount of time a user has spent logged into a particular application (e.g., for a student, this may be a description of how often and how long the student has been working on homework in a particular software application), and how many questions the user has responded to.

In conventional software development environments, each software application is specifically programmed to detect a specific set of user interactions and generate appropriate log files or other output that may be used to determine the desired metrics. This approach requires a significant amount of software development efforts, as such metrics analysis software and code must be programmed separately for each software application—each software application requires its own set of instructions to detect specific user interactions and generate output upon detecting such user interaction.

Additionally, in this conventional approach, each software application maintains its own logging and metrics analysis systems (programmed by the software's respective developers) which can make it more difficult to analyze metrics across a collection or suite of software applications. The generated metrics are typically stored separately and may not be in formats that are compatible with one another, making metric aggregation across software applications difficult.

Software applications are typically offered in a client-server environment, in which user interacts with a software application via messages communicated over a communication network (e.g., network 120, FIG. 1). The present system monitors such network-based communications to detect actions that a user is taking within a particular software application. By analyzing the network communications as described herein, the present system can generate data and analytics describing how a user (or an anonymized group of users) interact with particular software applications.

In embodiments of the present system, a plugin or other relatively simple element of software code is provided to software application developers for incorporation in a particular software application or collection of software applications. The plugin is configured to analyze (or transmit to a remote system for analysis) network traffic generated by actions taken by the user while using the software application. The network traffic, often encoded in the form of a hypertext transfer protocol (HTTP) or HTTPS request, incorporates data (e.g., text, parameters, values, fields, and the like) that are created based upon the action that the user has taken. Although the disclosure describes the invention in terms of processing and analyzing network traffic involving HTTP requests, it should be readily apparent to a person of ordinary skill in the art that the network traffic analysis techniques described herein are applicable to other forms of network traffic and communications. For example, the system may analyze and process communications occurring via WebSocket (a distinct protocol, but relies on HTTP), REST (another protocol that relies on HTTP protocol), SOAP (similar to REST), HTTP/2 (next gen HTTP), and the like. Other alternative communication protocols that may be analyzed may include SCP, FTP, SMTP, or POP3. In general, any UDP or TCP/IP connection traffic could be analyzed in the manners described herein. Once captured, the present system attempts to map the data incorporated into the HTTP request to items defined in a schema definition associated with particular actions a user may take within the software. The mapping may occur following a set of logical matching rules, fuzzy matching and, in some cases, may be supplemented using machine learning (ML) engines and artificial intelligence. Example machine learning or artificial intelligence algorithms that may be adapted to perform the various forms of matching described herein can include the Aho-Corasick algorithm or the Boyer-Moore algorithm. Similarly Levenshtein distance, K-nearest neighbor, Bayesian algorithms, and/or the Soundex algorithm could be utilized to construct mapping engines for use in processing network communications as described herein.

As the data retrieved from the HTTP request (or a series of related HTTP requests) is mapped onto the items in the relevant schema definition, the mapped data is incorporated into an information object that can be sent to existing data-pipelines and services in a known information format that is schema compliant. The information object can then be analyzed to generate desired analytics. Additionally, several feedback loops occur in order to improve matching rules.

To illustrate, in a typical use case, a user may login to an application. The login time may be a useful data point to gather for metrics describing how the application is typically utilized by users. When the user logs on to the application, an HTTP request is generated by software running on the user's computing device (e.g., a web browser or other thin-client application) and transmitted to the server computer hosting the software application. The HTTP request will incorporate data (i.e., parameters and values) associated with the logon request (e.g., a user name, an identification of the software application being logged onto, a request to access a logon service, security credential information, and the like).

The present system (e.g., via the plugin) captures the content of the HTTP request and analyzes it in view of various schema definitions established for the software application. If a logon schema is defined, the system can match data contained within the logon HTTP request and be able to identify data in the HTTP request that matches the items included in the logon schema to create a complete information object. That information object can then be transmitted to a remote system for processing. As such, the completed logon request information can be used to determine that the user executed a logon request within the software application. The operation of the system does not require that the software developer create special code or other complex routines for data analytics and processing. Instead, by processing communications that occur during normal operation of the software application (i.e., network communications) metrics can be generated by external actors as described in the present disclosure.

Figure 3:
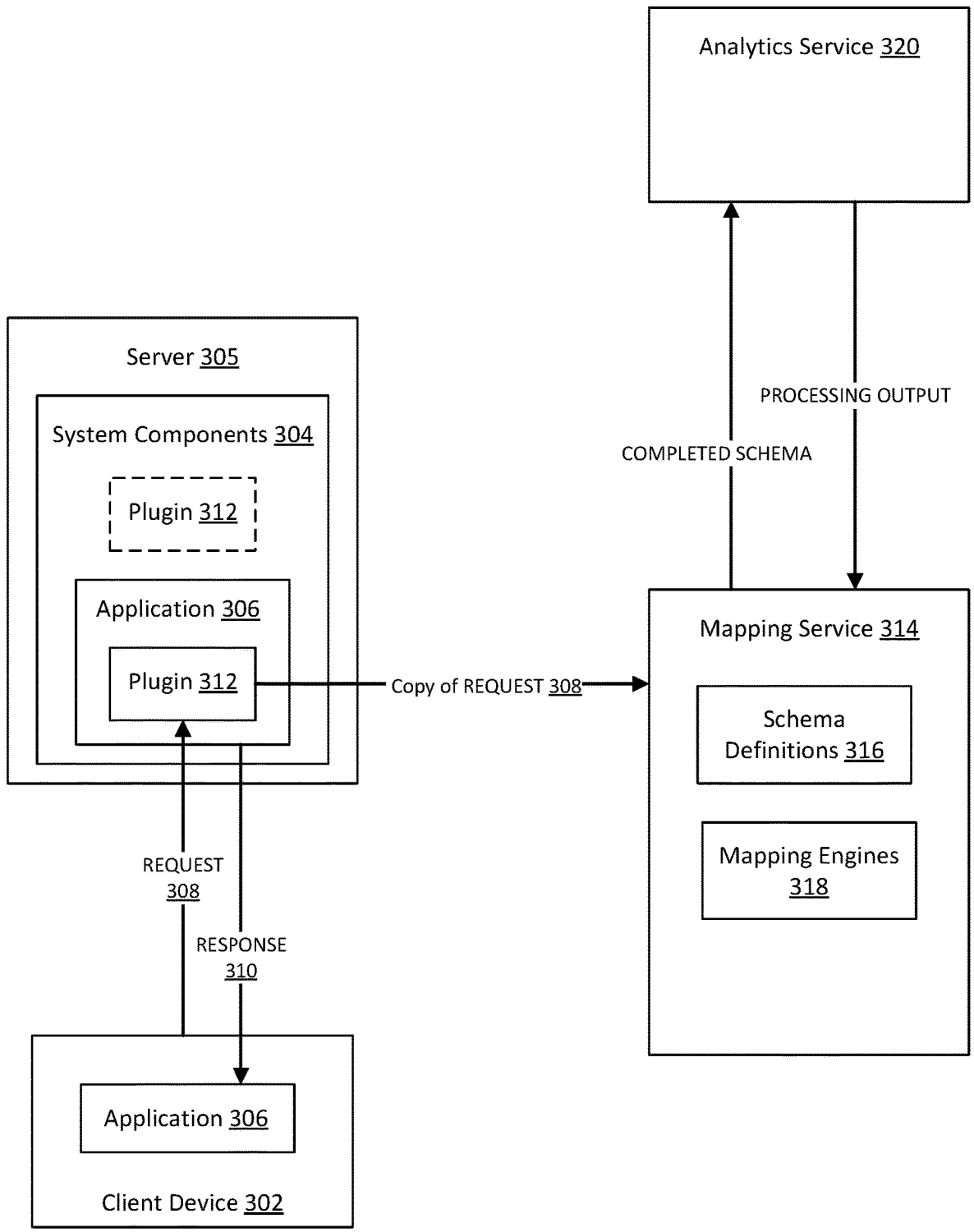
FIG. 3 is a block diagram depicting a system for implementing embodiments of the present disclosure.

FIG. 3 is a block diagram depicting a system for implementing embodiments of the present disclosure. In system 300, a user, operating a client device 302 (e.g., a personal computer, laptop, mobile device, or other computer system capable of running software such as client 106 of FIG. 1) accesses a software application 306 running on client device 302 to access and/or interact with content provided by system 300. Typically, software application 306 interacts with remote computer systems, such as server 305 in order to retrieve content to be displayed on client device 302 by application 306. While the user uses application 306, inputs provided by the user into user device 302 and application 306 can be provided to server 305 so that server 305 can take appropriate action and generate new content to be transmitted back to client device 302 for display in application 306.

In various embodiments, for example, application 306 may include a web browser, or other form of thin-client, configured to interact with a web server application hosted by server 305 in order to retrieve and access content. In such an embodiment, server 305 may be configured to implement a number of system components 304, which enable communications with remove client devices via appropriate communication networks (e.g., network communication subsystems, internet servers, and the like).

Server 305 is configured to implement a specific application 306 that is accessed by client device 302. Typically, client device 302 interacts with application 306 through a series of data transmissions that are either initiated or received by application 306 of client device 302. For example, application 306 may issues a number of data requests (e.g., hypertext transfer protocol (HTTP) requests) to application 306 via requests 308. Requests 308 may identify specific content assets that application 306 wishes to retrieve from application 306. For example, a user of client device 302 may provide an input to application 306 requesting that the application 306 display a particular piece of content (e.g., a text content, video content, audio content, or other multimedia). In response to that user input, application 306 creates an appropriate request 308 and transmits that request 308 to server 305 for processing by application 306. Responsive to the request, application 306 retrieves the requested content and transmits the content to client device 302 and, specifically, application 306 via response 310.

In some cases, request 308 may include more information than merely the identification of a specific piece of content. For example, depending upon the user interaction that generated the request, request 308 may include additional data such as a username or password (e.g., if the request 308 involves the user logging into application 306), an identification of a specific question and user-selected answer (e.g., if the request 308 is triggered by the user responding to a question posed to the user by application 306), or other data describing how the user is interacting with application 306 on client device 302.

As discussed above, system 300 is configured to process requests 308 received from client device 302 in order to detect specific user interactions that may be analyzed to generate useful metrics describing how the user is interacting with application 306 or how a group of users is interacting with application 306. Specifically, for a particular application 306 a set of schema definitions are established where the schema definitions include a number of items that describe the data associated with specific user interactions. For example, schemas may be defined for each of a logon activity, logout activity, content retrieval activity, or question response activity. Data contained with requests 308 received from client devices 302 are then mapped onto the relevant schema definitions in order to create a completed information object. The information object describes various attributes of a specific user interaction. The information object can then be sent to existing data-pipelines and services in a known information format that is schema compliant for analysis.

Specifically, server 305 includes a plugin 312 (which may alternatively be located within application 306 or external to application 306—as illustrated by the plugin 312 formed in the dashed box) that is configured to intercept requests 308 incoming to server 305 as the requests 308 are passed to application 306 for processing. Plugin 312 may be implemented within existing server side HTTP processing frameworks (i.e., Servlets, REST frameworks, etc). In some embodiments, the plugin 312 may further be located in the client device 302. In that case, plugin 312 may be implemented as a Javascript plugin configured to forward a copy of all HTTP requests to an external processing server (e.g., mapping service 314) which would process the HTTP requests as needed. Potentially private data such as passwords would be automatically obfuscated by the plugin 312. Plugin 312 may also be implemented (e.g., in a mobile device) in a browser plugin, except compiled for the mobile device.

Plugin 312 creates a copy of each received request 308 and transmits the same to mapping service 314 for processing. Mapping service 314 may be provided by a server computer remote from server 305, in which case plugin 312 transmits the copy of the request to mapping service 314 via an appropriate communication network. Alternatively, mapping service 314 may be implemented as a computing service executed within server 305, in which case mapping service 314 is local to server 305.

Figure 4:
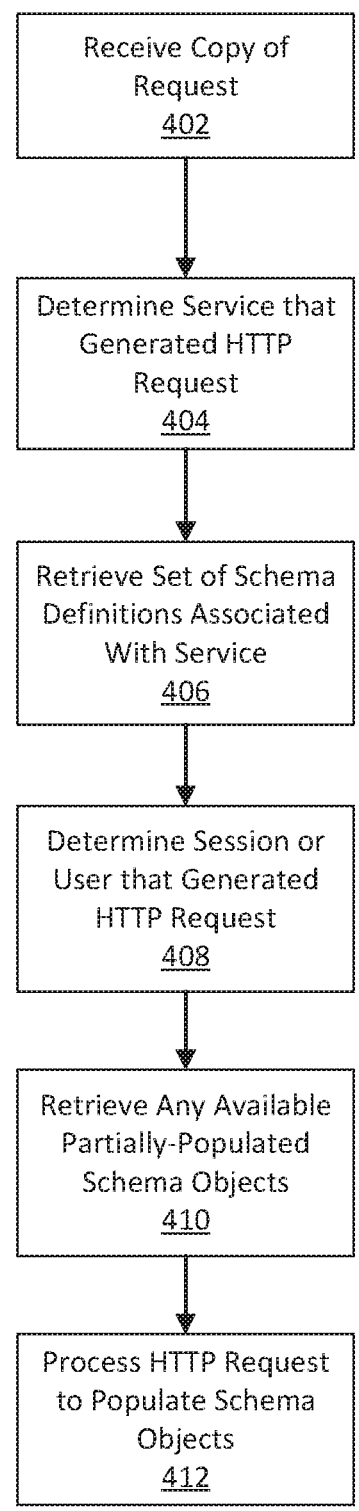
FIG. 4 is a flowchart depicting a method that may be implemented by a mapping service upon receipt of a copy of a request from the plugin of FIG. 3.

FIG. 4 is a flowchart depicting a method that may be implemented by mapping service 314 upon receipt of a copy of the request from plugin 312 of FIG. 3. Specifically, in step 402, mapping service 314 receives the request. In step 404, mapping service 314 determines the service or application associated with the request. For example, the body of the request may include a URL or other resource identifier that specifically identifies the application 306 being accessed by the client device 302 that generated the request.

For example, Table 1, below, shows an example request that may be generated by application 306, transmitted to server 305, and duplicated by plugin 312 to mapping service. Mapping service 314 can identify the service (i.e., application 306) associated with the request by parsing the "POST" line to identify the name of the application "user-application" or the "Host" line of the request to identify the hosting server "user-application.com." Both data values can be utilized in a database lookup operation to identify the associated service.

TABLE 1

Example HTTP Request

POST /user-application/login HTTP/1.1
User-Agent: Mozilla/5.0 (X11; Linux x86_64) AppleWebKit/537.36 (KHTML, like Gecko) Chrome/80.0.3987.132 Safari/537.36
Host: www.user-application.com
Content-Type: application/x-www-form-urlencoded
Content-Length: length
Accept-Language: en-us
Accept-Encoding: gzip, deflate
Connection: Keep-Alive
Session-Id: SessionABC123
user=johnsmith&password=myS3rect!&courseId=CS101

As illustrated in Table 1, a request may include a number of parameter names (e.g., "Content-Length" or "Session-ID"), where each parameter is associated with a particular value (e.g., "length" or "Session ABC123").

In step 406, after the service has been identified, mapping service 314 retrieves a set of schema definitions associated with the service. With reference to FIG. 3, the schema definitions may be retrieved from schema definitions repository 316.

Schema definitions are data entries that describe a well-formed digital document or information object. A schema definition may describe a set of values or items that should be contained in a completed information object that is based on the schema definition. The schema definition may also set forth, for each required value in the schema, various attributes or characteristics of the value. For example, a schema definition may, for each value contained within the definition, define a type of the value (e.g., numeric, text, bit string, integer, float value, or the like) as well as attributes of the value (e.g., optional or mandatory). In the present system, the schema definitions may further provide information to assist the user in finding a particular value in a received request (e.g., keywords that may help the mapping service 315 find the value in the received request 308), an indication of whether the name of the value (i.e., the parameter associated with the value) will be found in the request 308 or if "fuzzy" or synonym-based matching is allowed.

For a particular service or application 306, a number of different schema definitions may be established for different actions the user may take within the application 306. In some embodiments, for example, for a particular application 306, schema definitions may be established to define an application login event, an application logout event, a content request action, a question response item, and the like. Example schemas for user's login activity and logout activity are illustrated below in Table 2 and Table 3, respectively, below.

TABLE 2

| Field Name | Match Type | Optional? | Data Type |
| --- | --- | --- | --- |
| Login | Keyword | N | Keyword |
| Username | Fuzzy ('user', 'user_name', 'userid') | N | String 5-15 character |
| SessionID | Strict | N | String 1-100 characters |
| LogonTime | Format | N | Date:time |
| ApplicationID | Strict | N | String 1-100 characters |
| SectionID | Strict | N | String 1-100 characters |
| UserAgent | Strict | Y | String 1-125 characters |

TABLE 3

| Field Name | Match Type | Optional? | Data Type |
| --- | --- | --- | --- |
| Logout | Keyword | N | Keyword |
| Username | Fuzzy ('user', 'user_name', 'userid') | N | String 5-15 character |
| SessionID | Strict | N | String 1-100 characters |
| LogoutTime | Format | N | Date time |
| ApplicationID | Strict | N | String 1-100 characters |
| SectionID | Strict | N | String 1-100 characters |
| UserAgent | Strict | Y | String 1-125 characters |

With the schema for the application retrieved, the mapping service 314, in step 408 determines the user session that generated the request 308. When a user logs in and uses application 306, each use of the application 306 is part of a single session. When the user logs out and logs back into the application 306, a new session is initiated. With reference to the request depicted in Table 1, above, for example, the session can be identified based on the ID associated with the "Session-ID" parameter.

After identifying the session, in step 410, the mapping service identifies any partially-completed information objects that have been previously-created for this session. Finally, in step 412 the mapping service processes the received request 308 in view of the retrieved schema objects for the application 306 as well as the partially-completed information objects retrieved in step 410. This process is illustrated in more detail in the flowchart of FIG. 5, below.

Figure 5:
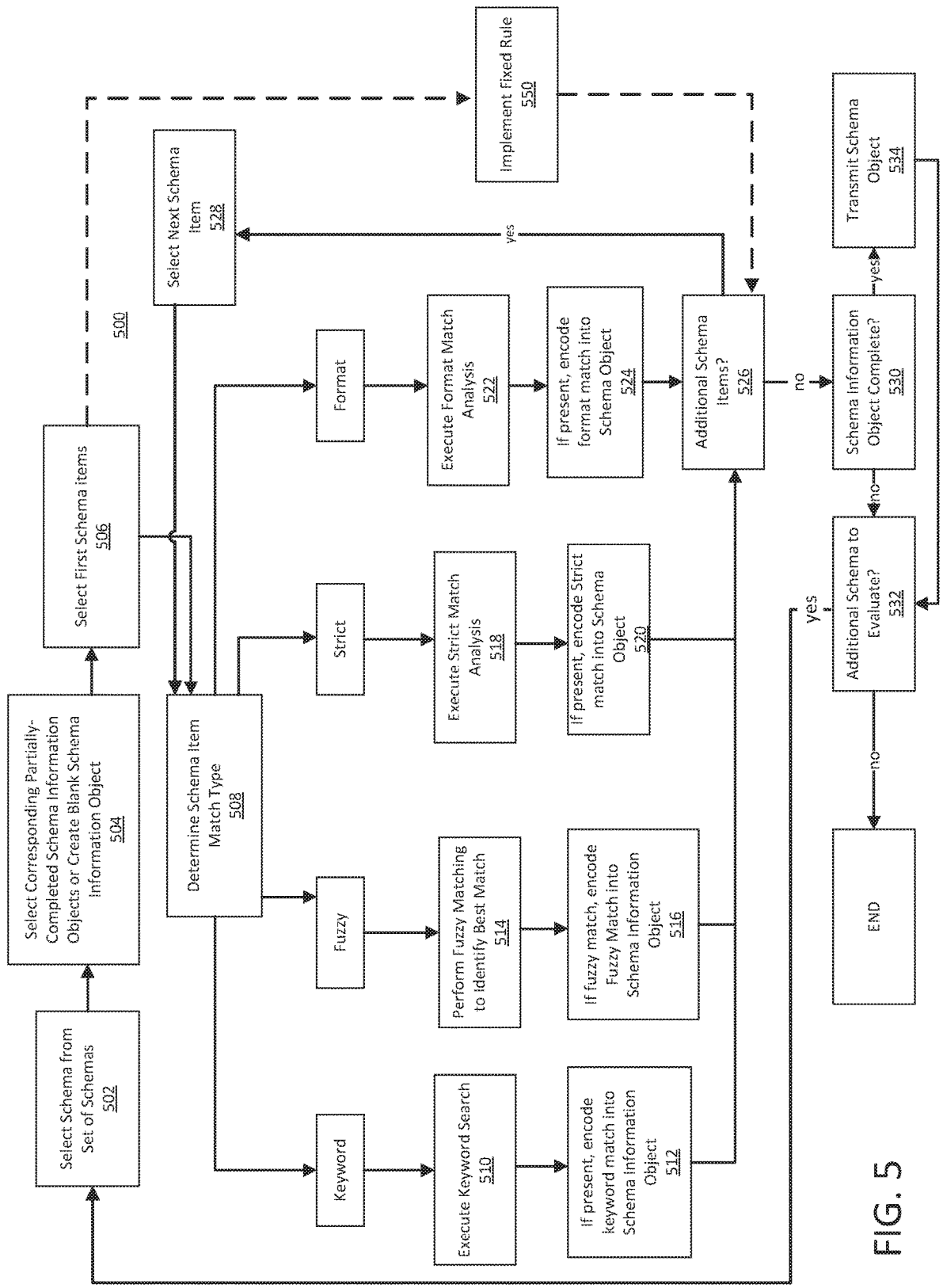
FIG. 5 depicts a method for processing a received request to populate an information object based on the set of schemas associated with a particular application.

FIG. 5 depicts a method 500 for processing a received request 308 in an attempt to fully populate an information object based on the set of schemas associated with a particular application. Method 500 may be executed by mapping service 314. In typical applications, method 500 may be executed a number of times for a received request 308 in which the method 500 is executed against each of the schema objects identified (e.g. in step 406 or 410 of FIG. 4) for the particular session or application associated with the received request 308.

Accordingly, in step 502 a first schema of the set of schemas is selected. In step 504, the mapping service 314 determines whether a partially-completed information object already exists for the selected schema, in which case method 500 is implemented so as to complete missing elements of the previously-existing information object. If not, a new blank information object is created that includes blank entries for each of the items contained within the present schema.

In step 506, the first schema item in the selected schema is selected. To illustrate, with reference to Table 2, above, the depicted schema includes the schema items Login, Username, SessionID, LogonTime, ApplicationID, SectionID, and UserAgent.

Having identified a particular schema item, in step 508 the mapping service 314 determines a match type associated with the schema item. As seen, in Table 2 and Table 3, above, each schema defines, for each schema item, a particular match type. The match type data provides information to mapping service 314 that enables mapping service 314 to properly process the received request 308 in order to identify data matching the schema items.

To implement the different match types, mapping service 314 may implement a number of different mapping engines 318 where each mapping engine 318 is configured to implement a particular matching technique. For example, in performing method 500, the mapping service 314 may be configured to execute mapping engines 318 for keyword matching, fuzzy string matching, strict matching, and format-based matching.

Returning to FIG. 5, if the match type determined in step 508 is that of 'keyword' (e.g., in the schema of Table 2, the Login schema item has a matching type of keyword), the mapping service 314 performs a keyword search of the received request 308 to determine whether the identified keyword is contained within the request. If the keyword is present (e.g., the keyword "login" is found in the request), in step 512, the mapping service 314 encodes into the present information object (e.g., retrieved or created in step 504) a value indicating that the keyword has been identified.

Alternatively, if in step 508 the match type indicated the schema item requires a match type of Fuzzy (e.g., in Table 2 the username schema item requires a match type of fuzzy), the mapping service 314 performs a fuzzy match to determine whether the identified schema item is found in the received request. Typically, this will involve identifying a parameter in the request that matches the schema item. In the example of the username schema item, this may involve performing fuzzy matching to identify portions (i.e., parameters) of the received request 308 that may contain a username even if the parameter is not specifically identified by the term 'username'. For example, fuzzy matching may involve identifying portions of the received request 308 that contain text strings that are close (e.g., a threshold number of characters match) the string username. For example, portions of the received request 308 may identify a 'user name', 'user_name', 'uname', 'user', 'user-id' and the like. In that case, the fuzzy matching scheme may match those sections of the received request 308 in order to identify the user name associated with the request.

In some cases, such fuzzy matching may be supplemented by trained machine learning approaches, in which training data sets are utilized to train an artificial intelligence (AI) or machine learning (ML) engine to perform pattern matching in order to identify particular schema items within received requests 308. Such approaches may involve the AI or ML engines identifying sets of synonyms (either the same language or in different languages) and determining whether a match to those synonyms is found within the received request 308.

If a fuzzy match is identified in the received request 308, in step 516 the mapping service 314 encodes into the present information object (e.g., retrieved or created in step 504) data describing the fuzzy match (i.e., the value associated with the parameter in the request that satisfied the fuzzy match requirement). In the case of a fuzzy match to the user name schema object, the data may include both the term that fuzzy matched "user_name" (i.e., the parameter) as well as the value associated with the matching term in the received request 308.

If the match type determined in step 508 is that of 'strict' (e.g., in the schema of Table 2, the SessionID schema item has a matching type of strict), the mapping service 314 determines in step 518 whether the specific string identified by the schema item (i.e., 'SessionID') is found in a parameter in the received request 308. If so, in step 520, the mapping service 314 encodes the value associated with the matched string into the present information object (e.g., retrieved or created in step 504).

If the match type determined in step 508 is that of 'format' (e.g., in the schema of Table 2, the LogonTime schema item has a matching type of format), the mapping service 314 determines in step 522 whether a value matching the format set forth by the schema item (e.g., in the case of the LogonTime schema item the format is the specific forma of a "Date:Time" value) is found in the received request 308. If so, in step 524, the mapping service 314 encodes the associated value into the present information object (e.g., retrieved or created in step 504).

Although the method of FIG. 5 illustrates four different data matching approaches that may be utilized to process a received request 308, it should be understood that a mapping service 314 implemented in accordance with this disclosure may provide additional alternative data matching schemes (e.g., implemented by different or additional mapping engines 318). Or, in some cases, a mapping service 314 implemented in accordance with this disclosure may be configured to implement fewer than four data matching approaches, depending on the system implementation. Furthermore, additional information may be incorporated or encoded into the information object. For example, a current date and time at which the information object is being processed, Internet protocol addresses of the source and destination of the received request, and the like, and the raw contents of the received request may also be encoded into the information object.

In step 526, the mapping service 314 determines whether the current schema being processed (i.e., the schema selected in step 502) has any more schema items to be processed. If so, the next schema item in the schema is selected in step 528 and the method return to step 508 and repeats for the select next schema item. If, however, in step 526 it is determined that there are no additional schema items in the current schema to be processed, the method proceeds to step 530.

In step 530, the mapping service 314 determines whether the current schema information object (i.e., the schema information object retrieved or created in step 504) being processed has been completed. A complete schema information object is one in which entry in the information object (where an entry in the information object corresponds to an entry in the related schema) has been populated with values via one of the keyword, fuzzy, strict, or format-based approaches described above.

If the present information object is not complete, the incomplete information object is saved. Then, in step 532 the mapping service determines whether there are additional schema to be processed (i.e., of the schema identified in step 406 of FIG. 4). If so, the method returns to step 502 where the next schema in the set of schemas is selected and the mapping method of FIG. 4 is repeated.

If, however, in step 532 it is determined that no additional schemas exist to be processed, the method ends.

Returning to step 530, if the mapping service 314 determines that the schema information object is completed, in step 534 the mapping service 314 transmits the completed schema information object to an analytics service (e.g., analytics service 320 of FIG. 3) for processing. As described above, the analytics service can extract data from the completed schema information objects in order to generate analytic data regarding how a user is interacting with the service that generated the schema information object. Such analytics may involve determining the average amount of time a user spends logged into the system, or the frequency with which a user interacts with the system. The analytics service may additionally analyze the completed information objects to determine the rates at which particular functions within the service are utilized by users or the specific way that particular users interact with those functions.

As discussed above, in some embodiments, the mapping service 314 uses AI or ML engines (e.g., mapping engines 318) to analyzed received requests 308. Such systems require training and, accordingly, in some embodiments the analytics service 320 may be configured to provide feedback to mapping service 314 that may be used by mapping service 314 to train or update its AI or ML mapping engines 318.

Figure 6:
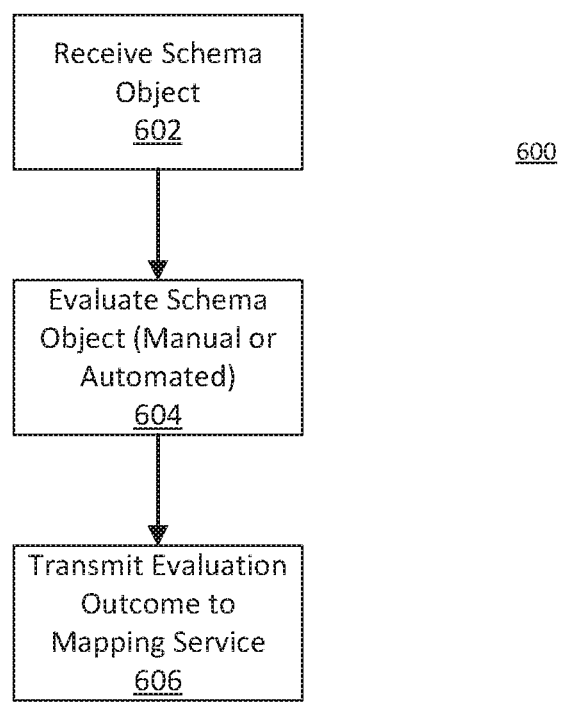
FIG. 6 is a flowchart depicting an example method for an analytics service to provide feedback to a mapping service.

FIG. 6 is a flowchart depicting an example method 600 for the analytics service (e.g., analytics service 320) to provide feedback to a mapping service (e.g., mapping service 314) enabling the mapping service to use the feedback as training data for AI or ML mapping engines.

In step 602, the analytics service 320 receives a completed schema information object from the mapping service 314. In step 604 the analytics service 320 evaluates the completed information object to determine whether the information object can be validated. If there's a successful validation, in step 606 an indication that the schema information object was successfully validated can be transmitted back to the mapping service. The mapping service can then use this feedback (i.e., that the information object was successfully validated) to strengthen or make permanent (e.g., by increasing a confidence level of) the fuzzy matching rules that were implemented by the mapping service's AI or ML engines to create the completed information object.

In some embodiments, the mapping service may determine that a rule designated as fuzzy has reached a sufficiently high confidence level to qualify as a fixed rule. For example, if a particular fuzzy rule, when executed, achieves a valid data output at a sufficiently high rate (e.g., the rule is successful in accurately populating a portion of an information object over 99.9% of the time), the rule may be re-established as a fixed rule that is always executed for particular schema items. In that case, the mapping service may be configured to always implement the rule whenever encountering a particular schema item for analysis or type of schema item, for example. For example, with reference to FIG. 5, if a particular rule has been designated as a fixed rule, upon encountering a schema item associated with the fixed rule in step 506, the depicted method may instead advance to step 550 to execute the designated fixed rule to populate the information object associated with the schema item. After applying the fixed rule, the method returns to step 526 to proceed with analysis of any remaining schema items, as depicted.

In some embodiments, such a fixed rule may be established manually by a system operator, for example, reviewing fuzzy matching rules that have very high confidence levels (e.g., greater than a predetermined threshold confidence level) and manually preparing the fixed rule based upon or otherwise derived from the fuzzy rule having the high confidence level. In other embodiments, the fixed rule may simply be a copy of the established fuzzy rule. Or, a machine learning engine may be configured to convert the fuzzy rule into the fixed rule.

Conversely, if validation fails, an indication of the validation can instead be transmitted back to the mapping service. The mapping service can use the indication that the information object failed validation to modify or update the AI or ML engines and the rules they implemented to create the invalid information object. For example, based on receiving an indication that the information was invalid, the mapping service may increase the strictness with which fuzzy matches must be made when completed future information objects based on the same schema.

In some embodiments, the analytics service may determine that an information object is not just invalid, but that the data is incorrect or inaccurate (which could result in incorrect analytics being generated). In that case, the rules used by the mapping service to generate the information object may be corrupted or inadequate to the tasks. In that case, upon receipt of such a notification, the mapping service may determine that the rules used to create the information object that was designated as incorrect are in fact anti-rules—that the rules cannot be used to populate future information objects.

In some embodiments, analytics or business process systems that consume the completed schema information objects from the mapping service can contribute to the training of the mapping service's AI and ML engines as well. For example, as a system consumes data from the complete information objects, the system can automatically provide feedback to the rules implemented by the mapping service to give an indication of data quality for the field to parameter mappings. The feedback will be provided by sending a message back down the data pipeline indicating information about the data quality which would then be read by the mapping service which would update its rules database and schema definitions. Feedback could consist of an enumeration value and a numeric value. Examples of enumeration values could be: VALID, NOT_PROCESSABLE, NOT_PROCESSABLE_BY_CURRENT_SYSTEM, VALID_BUT_POSSIBLY_INCOMPLETE, INCOMPLETE. The numeric value could be an overall indicator of message quality as automatically judged by the consuming system.

Additionally, mechanisms could exist to provide feedback on specific field mappings in order to more precisely improve rules or the operation of the mapping service. A second plugin could support this operation making it seamless for data consumers to integrate this feedback mechanism. If the message consuming system is not able to easily integrate with this second plugin, a web service will be made available to process feedback in the same manner.

In generating feedback to the mapping service in this manner, the feedback may be provided manually. In embodiments, a data-analyst or systems engineer may discover a field mapping in a completed schema information object that is not correct on a particular record, a UI will be made available where the data-analyst or systems engineer can indicate to the mapping service that the field mapping was made in error for that specific record. If a data-analyst or systems engineer discovers a known field mapping for a particular schema type, a UI will be made available where the data-analyst or systems engineer can manually add the mapping as a known rule to the schema definitions so that the ML and AI engines will not have to make that determination.

Figure 7:
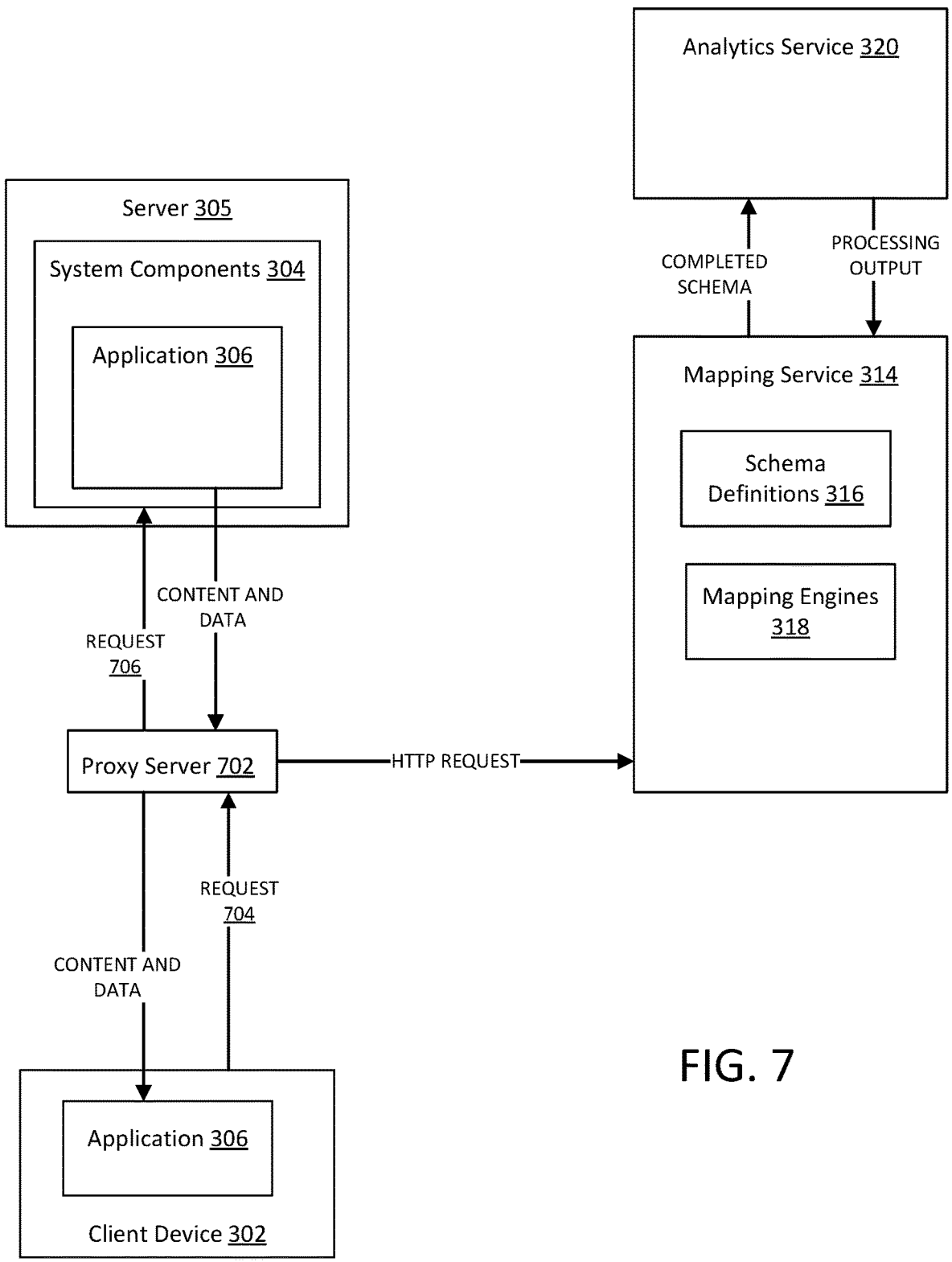
FIG. 7 is a block diagram depicting an alternative embodiment of a system for implementing embodiments of the present disclosure.

In some embodiments of the present system, a proxy server may be implemented to monitor HTTP and HTTPS transmissions in order to forward requests (e.g., received requests 308) to a mapping service. FIG. 7 depicts a system configuration that uses a proxy server to intercept HTTP and HTTPS transmissions in order to generate requests that can be forward to a mapping service for processing in accordance with the disclosure herein. FIG. 7 generally depicts the system of FIG. 3, but modified to incorporate a proxy server.

As illustrated in FIG. 7, the system includes proxy server 702. Proxy server 702 is located between client device 302 and server 305. When client device 302 wishes to transmit a request to application 306 running on server 305, client device 302 transmits the request 704 to proxy server 702. Proxy server 702 receives the request 704 and retransmits it to server 305 for processing. At the same time, proxy server 702 is configured to intercept the incoming requests 704 and pass a copy of the request 704 to mapping server 314 for processing as described herein.

Specifically, proxy server 702 creates a copy of each received request 704 and transmits the same to mapping service 314 for processing. Mapping service 314 may be provided by a server computer remote from server 305, in which case proxy server 702 transmits the copy of the request to mapping service 314 via an appropriate communication network. This embodiment may be relatively simply to implement as, in contrast to the system configuration illustrated in FIG. 3, the approach does not require the installation of a plugin into server 305 or the integration of a plugin into application 306.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system, comprising:
 a memory storing a plurality of schema definitions, each schema definition being associated with at least one service;
 a network interface; and
 a processor, the processor being configured to perform the steps of:
  receiving a data transmission using the network interface, the data transmission encoding a content of a hypertext transfer protocol request and an identification of a first service, wherein the hypertext transfer protocol request is a request from a client device that is intercepted, and the data transmission encoding the content of the hypertext transfer protocol request is a copy of the request that was intercepted;
  determining, using the identification of the first service, a first schema definition in the memory that is associated with the first service, the first schema definition including a plurality of schema items;
  parsing the content of the hypertext transfer protocol request to identify a plurality of parameters and a plurality of values, each value in the plurality of values being associated with a parameter in the plurality of parameters; and
  for each schema item in the plurality of schema items:
   identifying a parameter in the content of the hypertext transfer protocol request that matches the schema item;
   encoding the value associated with the parameter into a schema information object; and
   storing the schema information object in the memory.

2. The system of claim 1, wherein the processor is configured to perform the steps of:
 determining that the schema information object includes values associated with parameters that correspond to each schema item in the first schema definition; and
 transmitting the schema information object, using the network interface, to a remote computer service.

3. The system of claim 1, wherein the processor is configured to perform the step of identifying a parameter in the content of the hypertext transfer protocol request that matches the schema item by:
 identifying a string in the content of the hypertext transfer protocol request that matches a name of the schema item.

4. The system of claim 1, wherein the processor is configured to perform the step of identifying a parameter in the content of the hypertext transfer protocol request that matches the schema item using a machine learning engine.

5. The system of claim 4, wherein the processor is configured to perform the steps of:
 receiving a notification that the schema information object is valid; and
 modifying a confidence level of the machine learning engine in response to receiving the notification.

6. The system of claim 1, wherein the processor is configured to perform the steps of:
 receiving a second data transmission using the network interface, the second data transmission encoding a second content of a second hypertext transfer protocol request and an identification of the first service;
 parsing the second content of the second hypertext transfer protocol request to identify a second plurality of parameters and a second plurality of values, each value in the second plurality of values being associated with a parameter in the second plurality of parameters; and
 for each schema item in the plurality of schema items:
  identifying a parameter in the second content of the second hypertext transfer protocol request that matches the schema item;
  encoding the value associated with the parameter into the schema information object to create a modified schema information object; and
  storing the modified schema information object in the memory.

7. The system of claim 6, wherein the processor is further configured to perform the steps of:
 determining that the modified schema information object includes values associated with parameters that correspond to each schema item in the first schema definition; and transmitting the schema information object, using the network interface, to a remote computer service.

8. The system of claim 1, further comprising a proxy server and wherein the proxy server is configured to perform the steps of:
receiving the hypertext transfer protocol request from a user device;
encoding the hypertext transfer protocol request into the data transmission; and
transmitting the data transmission to the network interface.

9. The system of claim 1, further comprising a server computer hosting a software application and wherein the server computer is configured to execute a plugin configured to perform the steps of:
receiving the hypertext transfer protocol request from a user device;
encoding the hypertext transfer protocol request into the data transmission; and
transmitting the data transmission to the network interface.

10. The system of claim 1, wherein the first schema definition includes at least one schema item associated with a user logon activity or a user logout activity.

11. A method, comprising:
receiving a data transmission using a network interface, the data transmission encoding a content of a hypertext transfer protocol request and an identification of a first service;
determining, using the identification of the first service, a first schema definition in a memory that is associated with the first service, the first schema definition including a plurality of schema items;
parsing the content of the hypertext transfer protocol request to identify a plurality of parameters and a plurality of values, each value in the plurality of values being associated with a parameter in the plurality of parameters; and
for each schema item in the plurality of schema items:
identifying a parameter in the content of the hypertext transfer protocol request that matches the schema item using a machine learning engine;
encoding the value associated with the parameter into a schema information object;
receiving a notification that the schema information object is valid;
modifying a confidence level of the machine learning engine in response to receiving the notification; and
storing the schema information object in the memory.

12. The method of claim 11, further comprising:
determining that the schema information object includes values associated with parameters that correspond to each schema item in the first schema definition; and
transmitting the schema information object, using the network interface, to a remote computer service.

13. The method of claim 11, further comprising:
identifying a parameter in the content of the hypertext transfer protocol request that matches the schema item by:
identifying a string in the content of the hypertext transfer protocol request that matches a name of the schema item.

14. The method of claim 11, further comprising:
receiving a second data transmission using the network interface, the second data transmission encoding a second content of a second hypertext transfer protocol request and an identification of the first service;

parsing the second content of the second hypertext transfer protocol request to identify a second plurality of parameters and a second plurality of values, each value in the second plurality of values being associated with a parameter in the second plurality of parameters; and
for each schema item in the plurality of schema items:
identifying a parameter in the second content of the second hypertext transfer protocol request that matches the schema item;
encoding the value associated with the parameter into the schema information object to create a modified schema information object; and
storing the modified schema information object in the memory.

15. The method of claim 14, further comprising:
determining that the modified schema information object includes values associated with parameters that correspond to each schema item in the first schema definition; and
transmitting the schema information object, using the network interface, to a remote computer service.

16. The method of claim 11, further comprising:
receiving the hypertext transfer protocol request from a user device;
encoding the hypertext transfer protocol request into the data transmission; and
transmitting the data transmission to the network interface.

17. The method of claim 11, further comprising:
receiving the hypertext transfer protocol request from a user device;
encoding the hypertext transfer protocol request into the data transmission; and
transmitting the data transmission to the network interface.

18. The method of claim 11, wherein the first schema definition includes at least one schema item associated with a user logon activity or a user logout activity.

19. A system, comprising:
a memory storing a plurality of schema definitions, each schema definition being associated with at least one service;
a network interface; and
a processor, the processor being configured to perform the steps of:
receiving a data transmission using the network interface, the data transmission encoding a content of a hypertext transfer protocol request and an identification of a first service;
determining, using the identification of the first service, a first schema definition in the memory that is associated with the first service, the first schema definition including a plurality of schema items;
parsing the content of the hypertext transfer protocol request to identify a plurality of parameters and a plurality of values, each value in the plurality of values being associated with a parameter in the plurality of parameters;
for each schema item in the plurality of schema items:
identifying a parameter in the content of the hypertext transfer protocol request that matches the schema item using a machine learning engine,
encoding the value associated with the parameter into a schema information object, and
storing the schema information object in the memory; and receiving a notification that the schema information object is valid; and modifying a confidence level of the machine learning engine in response to receiving the notification.

* * * * *